(12) United States Patent
Stephens (10) Patent No.: US 11,825,778 B1
(45) Date of Patent: Nov. 28, 2023

(54) DIRECT PIVOT SMART TOWER BOX MODULE AND COMMUNICATION SYSTEM

(71) Applicant: Travis Stephens, Saint Edward, NE (US)

(72) Inventor: Travis Stephens, Saint Edward, NE (US)

(73) Assignee: STEPHENS ELECTRIC & SUPPLY, INC., St. Edward, NE (US)

( * ) Notice: Subject to any disclaimer, the term of this patent is extended or adjusted under 35 U.S.C. 154(b) by 813 days.

(21) Appl. No.: 16/922,495

(22) Filed: Jul. 7, 2020

Related U.S. Application Data (60) Provisional application No. 63/020,416, filed on May 5, 2020.

(51) Int. Cl.
| | |
|---|---|
| *A01G 25/09* | (2006.01) |
| *A01G 25/16* | (2006.01) |
| *G06F 9/4401* | (2018.01) |
| *H04L 1/18* | (2023.01) |
| *B60C 23/04* | (2006.01) |
| *H04W 4/80* | (2018.01) |

(52) U.S. Cl.
CPC ......... *A01G 25/092* (2013.01); *A01G 25/165* (2013.01); *B60C 23/0479* (2013.01); *G06F 9/442* (2013.01); *H04L 1/18* (2013.01); *H04W 4/80* (2018.02)

(58) Field of Classification Search
CPC .... A01G 25/09; A01G 25/092; A01G 25/165; B60C 23/0479; G06F 9/442; H04L 1/18; H04W 4/80

USPC .................... 239/69, 728, 735; 700/283, 284
See application file for complete search history.

(56) References Cited

U.S. PATENT DOCUMENTS

| | | | |
|---|---|---|---|
| 6,337,971 B1 | 1/2002 | Abts | |
| 7,584,053 B2 | 9/2009 | Abts | |
| 8,185,303 B1 | 5/2012 | Wieting | |
| 8,924,101 B1 | 12/2014 | Schiltz et al. | |
| 9,408,352 B2 | 8/2016 | Schiltz et al. | |
| 9,538,712 B2 | 1/2017 | Korus | |
| 10,098,291 B2 * | 10/2018 | Andrews | ............... A01G 25/092 |
| 10,149,422 B2 | 12/2018 | Tippery et al. | |
| 10,285,343 B2 | 5/2019 | Whalley | |
| 10,381,970 B2 | 8/2019 | Parod et al. | |
| 10,384,557 B2 * | 8/2019 | Abts | ......................... B60L 3/12 |
| 10,405,505 B2 | 9/2019 | Kastl | |
| 10,485,190 B2 | 11/2019 | Whalley | |

(Continued)

*Primary Examiner* — Steven J Ganey
(74) *Attorney, Agent, or Firm* — Nasr Patent Law LLC; Faisal K. Abou-Nasr (57) ABSTRACT

A direct pivot smart tower box communication system is disclosed. The direct pivot smart tower box communication system includes a plurality of wheel sensor modules, a plurality of tower box modules, and a pivot center module. The plurality of wheel sensor modules are coupled to respective wheel hubs of respective towers of a direct pivot irrigation system. The plurality of tower box modules are coupled to the respective towers of the direct pivot irrigation system, wherein a tower box module includes a tower box module controller and is in communication with a wheel sensor module at a same tower as the tower box module. The pivot center module is coupled to the pivot center, wherein the pivot center module includes a pivot center module controller and is in communication with the plurality of tower box modules.

20 Claims, 8 Drawing Sheets

(56) References Cited

U.S. PATENT DOCUMENTS

| | | |
|---|---|---|
| 10,485,191 B2 | 11/2019 | Malsam |
| 10,499,572 B2 | 12/2019 | Charling et al. |
| 10,517,286 B2 * | 12/2019 | Miller ................. A01M 7/0071 |
| 10,531,616 B2 | 1/2020 | Thatcher |
| 10,582,671 B2 | 3/2020 | Abts et al. |
| 2012/0253530 A1 * | 10/2012 | Malsam ............... A01G 25/092 239/728 |
| 2013/0048747 A1 | 2/2013 | Pfrenger et al. |
| 2018/0310496 A1 | 11/2018 | Andrews et al. |
| 2020/0113144 A1 | 4/2020 | Moeller et al. |
| 2020/0154655 A1 | 5/2020 | Dick et al. |
| 2020/0159206 A1 | 5/2020 | Cella et al. |
| 2020/0159207 A1 | 5/2020 | Cella et al. |

* cited by examiner

DIRECT PIVOT SMART TOWER BOX MODULE AND COMMUNICATION SYSTEM

CROSS-REFERENCE TO RELATED APPLICATIONS

The present application claims the benefit under 35 U.S.C. § 119(e) of U.S. Provisional Application Ser. No. 63/020,416, filed May 5, 2020, and titled "DIRECT PIVOT SMART TOWER BOX MODULE AND COMMUNICATION SYSTEM," which is incorporated herein by reference in its entirety.

TECHNICAL FIELD

The present invention generally relates to irrigation systems, and, more particularly, to direct pivot irrigation systems.

BACKGROUND

Performing diagnostics on a direct pivot irrigation system may require a technician to climb up a tower of the direct pivot irrigation system, possibly while it is running. This may place the technician at risk of an injury from falling, electric shock, or getting snagged by moving parts. To reduce such risks, there is a need for systems that enable technicians to perform diagnostics remotely.

SUMMARY

A direct pivot smart tower box communication system is disclosed. The direct pivot smart tower box communication system includes a plurality of wheel sensor modules, a plurality of tower box modules, and a pivot center module. The plurality of wheel sensor modules are coupled to respective wheel hubs of respective towers of a direct pivot irrigation system. The plurality of tower box modules are coupled to the respective towers of the direct pivot irrigation system, wherein a tower box module includes a tower box module controller and is in communication with a wheel sensor module at a same tower as the tower box module. The pivot center module is coupled to the pivot center, wherein the pivot center module includes a pivot center module controller and is in communication with the plurality of tower box modules.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings. Referring generally to FIGS. 1 through 5B, a direct pivot smart tower box communication system 100 is disclosed. The direct pivot smart tower box communication system 100 includes a pivot center module 102, a plurality of tower box modules 104, and a plurality of wheel sensor modules 106 integrated within a direct pivot irrigation system 200.

Figure 1:
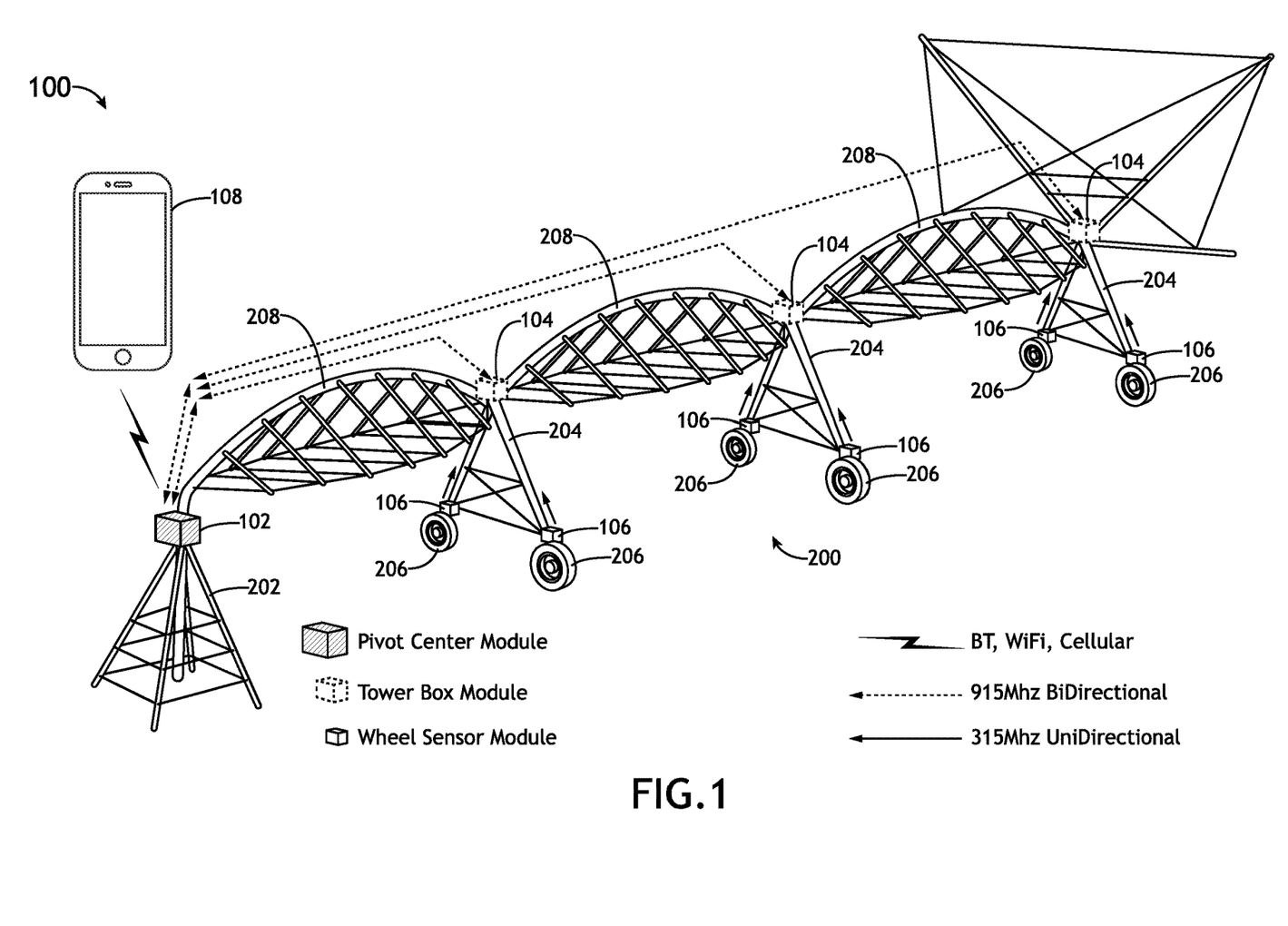
FIG. 1 is a block diagram illustrating a direct pivot smart tower box communication system integrated within a direct pivot irrigation system, in accordance with an example embodiment of this disclosure.

As shown in FIG. 1, the wheel sensor modules 106 are coupled to respective wheel hubs 206 of respective towers 204 of the direct pivot irrigation system 200. In some embodiments, a wheel sensor module 106 may be installed at each wheel hub 206 of the direct pivot irrigation system 200 (e.g., two or more wheel sensor modules 106 per tower 204). The tower box modules 104 are also coupled to respective towers 204 of the direct pivot irrigation system 206. In some embodiments, a tower box module 104 may be coupled to each tower 204 of the direct pivot irrigation system 200. Additionally, each tower box module 104 may include a respective controller (e.g., tower box module controller 300 in FIGS. 2-3B) configured to communicate with one or more wheel sensor modules 106 at the same tower 204 as the tower box module 104. The pivot center module 102 is coupled to the pivot center 202 of the direct pivot irrigation system 200. In embodiments, the pivot center module 102 also includes a respective controller (e.g., pivot center module controller 500 in FIG. 5A-5B). The pivot center module controller 500 is configured to communicate with the plurality of tower box modules 104 over a long range (LoRa) communications network or the like.

In embodiments, the pivot center module 102 is configured to collect tower status data from the tower box modules 104, so that the data may be stored/accessed by a remote server, local server, cloud storage, mobile device 108, or the like. For existing direct pivot irrigation systems, performing diagnostics may require a technician to climb up a tower of the direct pivot irrigation system, possibly while it is running. This may place the technician at risk of an injury from falling, electric shock, or getting snagged by moving parts. The direct pivot smart tower box communication system 100 disclosed herein helps reduce such risks by enabling technicians to monitor equipment and perform diagnostics remotely.

Figure 2:
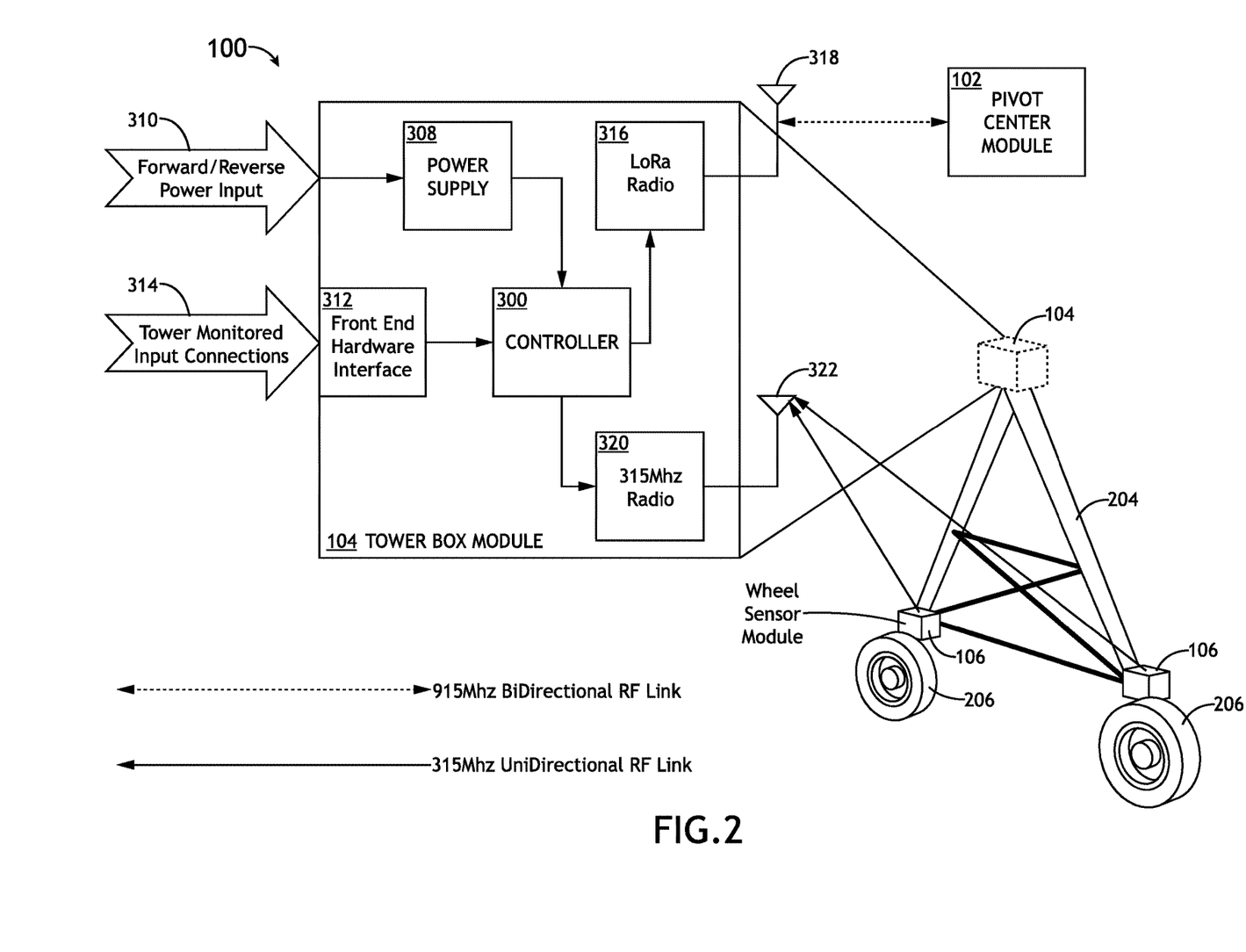
FIG. 2 is a block diagram illustrating a tower box module of the direct pivot smart tower box communication system, in accordance with an example embodiment of this disclosure.
Figure 3A:
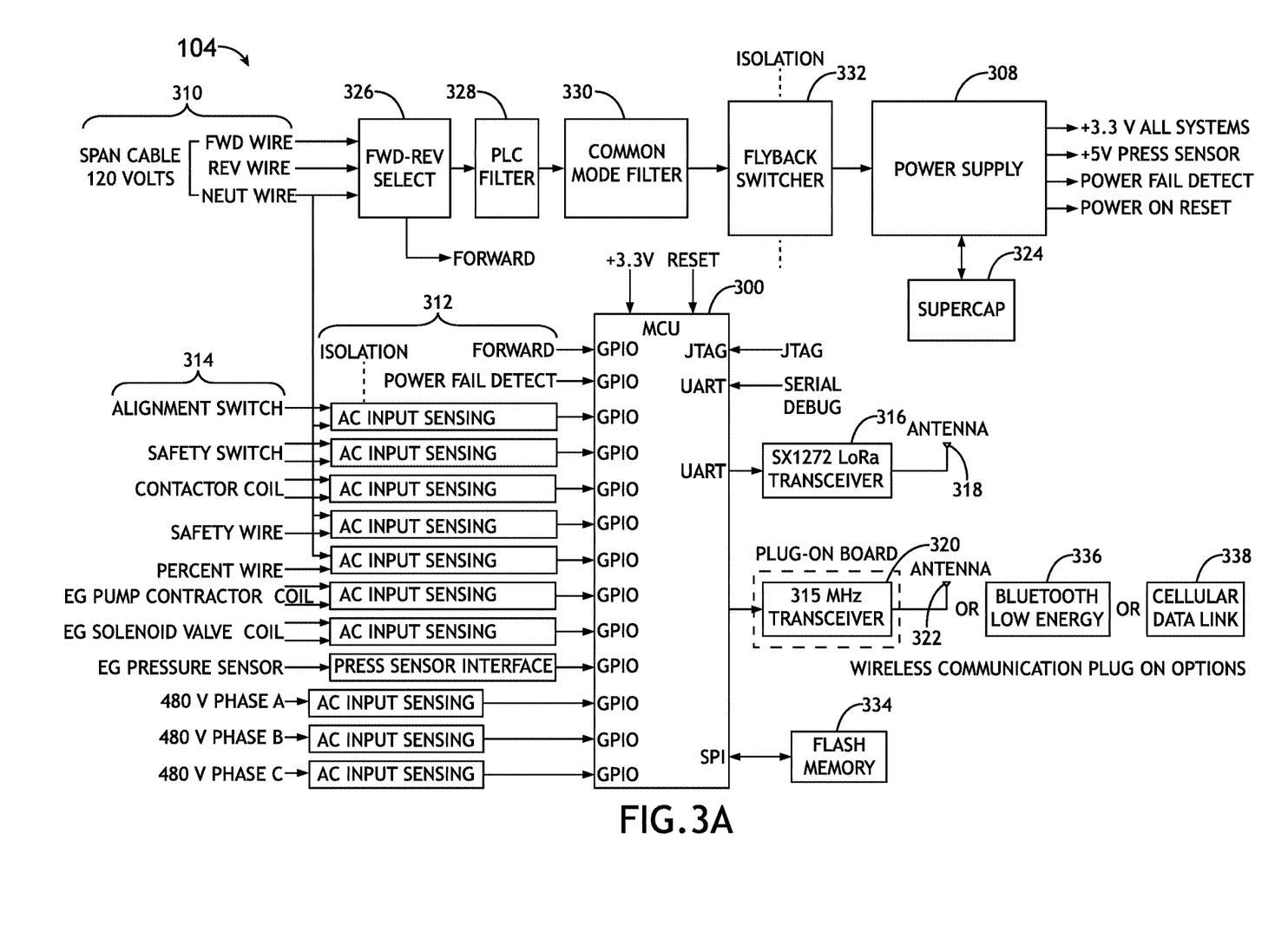
FIG. 3A is a block diagram further illustrating the tower box module of the direct pivot smart tower box communication system, in accordance with an example embodiment of this disclosure.
Figure 3B:
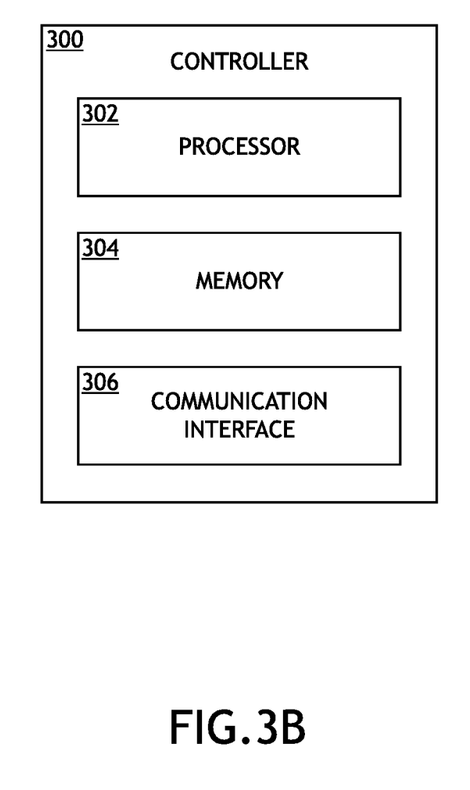
FIG. 3B is a block diagram illustrating a controller of the tower box module of the direct pivot smart tower box communication system, in accordance with an example embodiment of this disclosure.

FIGS. 2 through 3B are block diagrams illustrating a tower box module 104 of the direct pivot smart tower box communication system 100, in accordance with one or more example embodiments of this disclosure. In some embodiments, a tower box module 104 may be mounted in each tower box of the direct pivot irrigation system 200. Alternatively, tower box modules 104 may be installed at only some of the towers 204 (e.g., every other tower or at one or more specifically selected towers).

A tower box module 104 may include a tower box module controller 300 configured to communicate with the pivot center module 102 and with one or more wheel sensor modules 106 at the same tower 204 as the tower box module 104. In embodiments, the tower box module controller 300 is configured to collect tower status data via the wheel sensor modules 106 and other sensor/data inputs 314. The tower box module controller 300 may be further configured to communicate the tower status data to the pivot center module 102. As shown in FIG. 3B, the tower box module controller 300 may include, but is not limited to, at least one processor 302, memory 304, and communication interface 306.

The processor 302 provides processing functionality for at least the tower box module controller 300 and can include any number of microprocessors, microcontrollers, circuitry, field programmable gate array (FPGA) or other processing systems, and resident or external memory for storing data, executable code, and other information accessed or generated by the tower box module controller 300. The processor 302 can execute one or more software programs embodied in a non-transitory computer readable medium (e.g., memory 304) that implement techniques/operations described herein. The processor 302 is not limited by the materials from which it is formed or the processing mechanisms employed therein and, as such, can be implemented via semiconductor(s) and/or transistors (e.g., using electronic integrated circuit (IC) components), and so forth.

The memory 304 may include a tangible, computer-readable storage medium that provides storage functionality to store various data and/or program code associated with operation of the tower box module controller 300 and/or the processor 302, such as software programs and/or code segments, or other data to instruct the processor 302, and possibly other components of the tower box module controller 300, to perform the functionality described herein. Thus, the memory 304 can store data, such as a program of instructions for operating the tower box module controller 300, including its components (e.g., processor 302, communication interface 306, etc.). It should be noted that while a single memory is described, a wide variety of types and combinations of memory (e.g., tangible, non-transitory memory) can be employed. The memory 304 can be integral with the processor, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 306 may be operatively configured to communicate with components of the tower box module controller 300. For example, the communication interface 306 can be configured to retrieve data from the processor 302 or other devices, transmit data for storage in the memory 304, retrieve data from storage in the memory 304, and so forth. The communication interface 306 can also be communicatively coupled with the processor 302 to facilitate data transfer between components of the tower box module controller 300 and the processor 302. It should be noted that while the communication interface 306 is described as a component of the tower box module controller 300, one or more components of the communication interface 306 can be implemented as external components communicatively coupled to the tower box module controller 300 via a physical and/or wireless connection.

It shall be understood that the operations performed by the tower box module 104 are not necessarily all performed by one tower box module controller 300. In some embodiments, the operations may be performed by one or controllers. For example, one or more operations and/or sub-operations may be performed by a first controller, additional operations and/or sub-operations may be performed by a second controller, and so forth. Furthermore, some of the operations and/or sub-operations may be performed in parallel and not necessarily in the order that they are disclosed herein.

As shown in FIGS. 2 and 3A, the tower box module 104 may be powered by a connection 310 to forward and reverse wires in a span cable of the direct pivot irrigation system 200. FIG. 1 illustrates spans 208 that form structural connections between the pivot center 202 and the towers 204 of the direct pivot irrigation system 200. In embodiments, the spans 208 also include cables that electrically and/or communicatively connect the pivot center 202 with the towers 204. Among other connections for power, data, and/or communication, the span cables include forward and reverse wires for controlling forward and reverse movement of the towers 204. In embodiments, the tower box module 104 includes a power supply 308 connected to AC power (e.g., 120V AC power, or more generally in the range of 96 to 144V AC power) via the connection 310 to the forward and reverse wires.

The tower box module 104 is designed to be robust and survivable. For example, in embodiments, the power supply 308 and monitored inputs 314 are hardened against burst electrical fast transient (EFT) and surge events up to 2 kV (or possibly higher in some embodiments). The power supply 308 can also be designed to minimize loading of power line carrier signals that may be present on the forward and reverse wires, so that the power supply 308 does not interfere with installed GPS systems that use power line carrier communication.

The tower box module 104 may be unaffected by brief AC power interruptions, e.g., when the direct pivot irrigation system 200 changes direction from auto-reversing functions. In embodiments, the tower box module 104 is also configured to remain operational for a period of time (e.g., one minute, or more generally in the range of 30 to 120 seconds)

after the direct pivot irrigation system 200 has been shut down from due to a safety protocol and/or command from the control unit. This standby power function allows the status of all tower box modules 104 to be gathered by the pivot center module 102 following a safety shutdown event. In this regard, the tower box module 104 may be configured to remain operational long enough to report tower status data to the pivot center module 102 following a safety shutdown event. In some embodiments, the standby power function is provided by a supercapacitor based circuit so that there are no batteries to wear out or require replacement. For example, as shown in FIG. 3A, the power supply 308 may include or may be coupled with a supercapacitor 324 configured to power the tower box module controller 300 when standby power is required (e.g., after a safety shutdown event). Alternatively, the tower box module 104 may employ one or more batteries as a standby power source. In some embodiments, the power supply circuitry further includes or is coupled with a forward/reverse selection switch 326 at the forward/reverse wire connection 310, a powerline communication (PLC) filter 328, a common mode filter 330, and a flyback switcher/converter 332.

The tower box module 104 may be configured to collect tower status data from a plurality of monitored inputs 314. In embodiments, the tower box module controller 300 may be coupled to the inputs 314 via a front-end hardware interface 312, which may include a number of digital/analog input circuits. The monitored inputs 314 may be configured to collect tower status data, including, but not limited to: safety wire activation, percent wire activation, alignment microswitch status, safety microswitch status, motor contactor coil current, motor contactor 480V phase A switched voltage, motor contactor 480V phase B switched voltage, motor contactor 480V phase C switched voltage, tower movement (e.g., tower movement during ON cycles), end gun boost pump relay coil current, end gun solenoid valve coil current, end gun discharge water pressure, or any combination thereof. In this regard, the monitored inputs 314 may include, but are not limited to: an alignment switch/microswitch, safety switch/microswitch, a contactor coil voltage/current sensor, a safety wire voltage/current sensor, a percent wire voltage/current sensor, an end gun (EG) pump contactor coil voltage/current sensor, an EG solenoid valve coil voltage/current sensor, an EG pressure sensor, motor contactor 480V phase A switched voltage, motor contactor 480V phase B switched voltage, motor contactor 480V phase C switched voltage.

In embodiments, the tower status data collected by the tower box module controller 300 also includes wheel status data (e.g., wheel rotation rate and/or tire pressure data) detected by the wheel sensor modules 106. The tower box module 104 may include a low power wireless data link 320 (e.g., a 315 MHz transceiver, or the like) with a respective antenna 322 for receiving communications from the wheel sensor modules 106. In some embodiments, the low power wireless data link 320 is a 315 MHz unidirectional RF link configured to only receive communications from the wheel sensor modules 106. This may allow for reduced power consumption. Alternatively, the low power wireless data link 320 may be a bidirectional RF link for sending and receiving communications. In some embodiments, the low power wireless data link 320 may be coupled to the tower box module controller 300 as a plug-on/add-on board. In addition to or instead of the low power wireless data link 320, the tower box module controller 300 may also be connected to Bluetooth transceiver 336 and/or cellular data link 338 for communication with mobile devices 108, remote/cloud-based servers, mobile applications, and/or web-hosted applications.

In some embodiments, the tower box module controller 300 is coupled with a storage device 334 (e.g., flash memory) via a serial peripheral interface (SPI) or the like. The tower box module controller 300 may be configured to store the tower status data collected via the monitored inputs 314 and/or wheel sensor modules 106 in the connected storage device 334 and/or in an internal memory (e.g., memory 304). In embodiments, the tower box module controller 300 is configured to store the tower status data temporarily and delete or replace the data with new tower status data some time after communicating the tower status data to the pivot center module 102, or to a remote server, local server, cloud storage, mobile device 108, or the like.

Wireless communication between the tower box module 104 and the pivot center module 102 may be provided by Semtech LoRa technology. For example, in embodiments, the tower box module 104 includes a LoRa wireless transceiver 316 (e.g., a 915 MHz bidirectional RF link) communicatively coupled to the tower box module controller 300 and a respective antenna 318 for transmitting/receiving communications. The tower box module controller 300 may be configured to transmit collected tower status data to the pivot center module 102, via the LoRa wireless transceiver 316. In embodiments, the system 100 may employ advanced wireless technology including error detection to guarantee the integrity of received data. Additionally, the communication protocol may be based on a network model.

In embodiments, the tower box modules 104 may report their status periodically to the pivot center module 102 and receive an acknowledgment when their data packets are received. For example, the tower box module controller 300 may be configured to periodically transmit the collected tower status data to the pivot center module 102 via the LoRa wireless transceiver 316. The tower box module controller 300 may be further configured to receive a responsive acknowledgement from the pivot center module 102 after the collected tower status data is successfully transmitted (i.e., when the data is successfully received by the pivot center module controller 500).

Individual tower box modules 104 may be equipped with unique identifiers to allow coexistence with systems installed on other direct pivot irrigation systems in nearby fields. In embodiments, each tower box module 104 may be assigned a unique identifier configured to be scanned via a mobile device when the tower box module 104 is installed to setup a communication network that includes the plurality of tower box modules 104 and the pivot center module 102. For example, each tower box modules 104 may have a unique ID label that can be scanned with a smartphone application during installation to setup the communication network (system 100) for the direct pivot irrigation system 200.

Figure 4A:
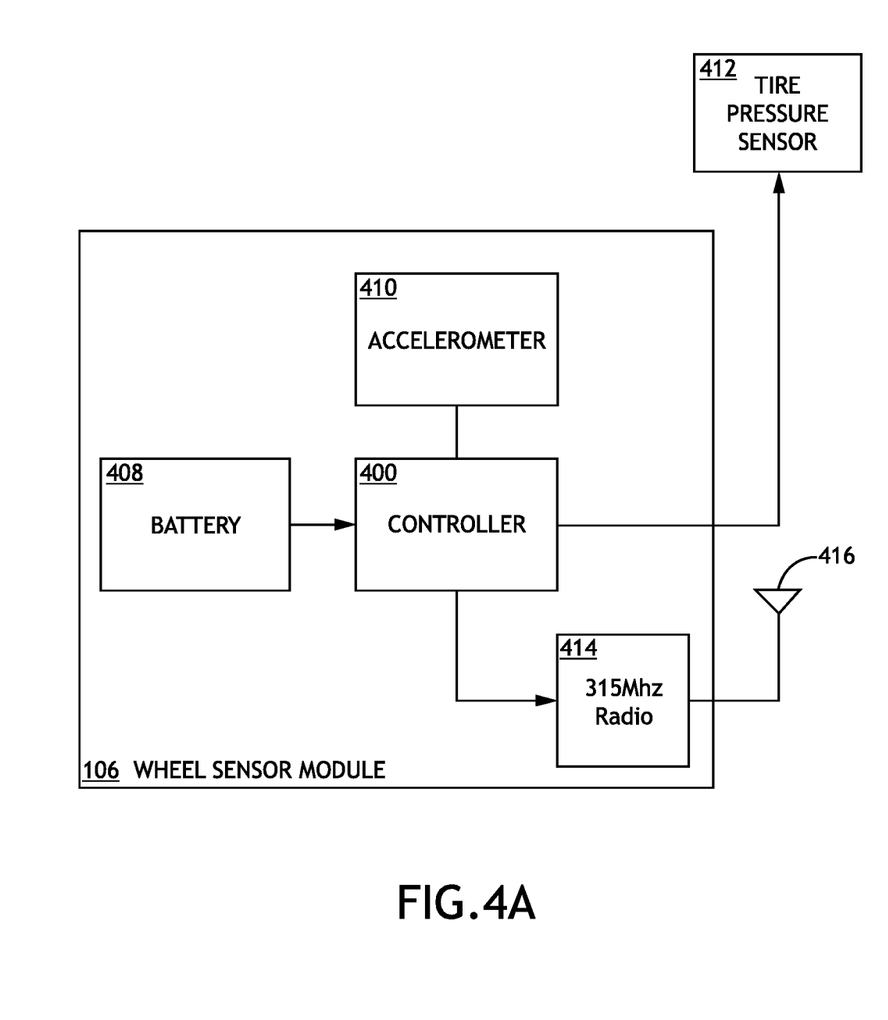
FIG. 4A is a block diagram illustrating a wheel sensor module of the direct pivot smart tower box communication system, in accordance with an example embodiment of this disclosure.
Figure 4B:
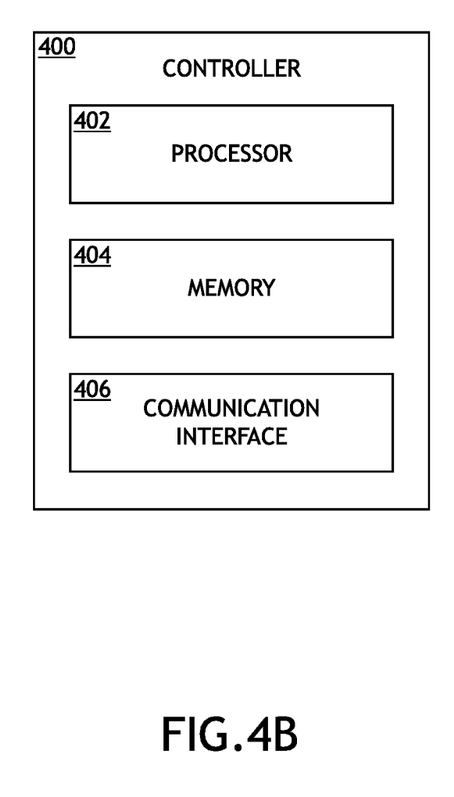
FIG. 4B is a block diagram illustrating a controller of the wheel sensor module of the direct pivot smart tower box communication system, in accordance with an example embodiment of this disclosure.

FIGS. 4A and 4B are block diagrams illustrating a wheel sensor module 106 of the direct pivot smart tower box communication system 100, in accordance with one or more example embodiments of this disclosure. In some embodiments, a wheel sensor module 106 may be coupled to each wheel 206 of the direct pivot irrigation system 200. For example, wheel sensor modules 106 may be mounted to respective wheel hubs of the wheels 206 for each tower 204 of the direct pivot irrigation system 200 (e.g., two/four wheel sensor modules 106 per tower, or the like). Alternatively, wheel sensor modules 106 may be mounted to only some of the wheels 206 (e.g., every other wheel, every other tower, one wheel or set of wheels per tower, or the like). In some embodiments, the wheel sensor modules 106 are mounted to the wheel hubs using specialized brackets, which may be supplied with the sensor modules 106 (e.g., sold/distributed as a package).

A wheel sensor module 106 may include a wheel sensor module controller 400 configured to communicate with a tower box module 104, e.g., a tower box module 104 at the same tower 204 as the wheel sensor module 106. The wheel sensor module controller 400 is configured to detect wheel status data (e.g., wheel rotation and/or tire pressure data) via accelerometer 410 and/or tire pressure sensor 412 and is further configured to communicate the wheel status data to the tower box module 104, which may then communicate the wheel status data to the pivot center module 102 along with other tower status data. As shown in FIG. 4B, the wheel sensor module controller 400 may include, but is not limited to, at least one processor 402, memory 404, and communication interface 406.

The processor 402 provides processing functionality for at least the wheel sensor module controller 400 and can include any number of microprocessors, microcontrollers, circuitry, field programmable gate array (FPGA) or other processing systems, and resident or external memory for storing data, executable code, and other information accessed or generated by the wheel sensor module controller 400. The processor 402 can execute one or more software programs embodied in a non-transitory computer readable medium (e.g., memory 404) that implement techniques/operations described herein. The processor 402 is not limited by the materials from which it is formed or the processing mechanisms employed therein and, as such, can be implemented via semiconductor(s) and/or transistors (e.g., using electronic integrated circuit (IC) components), and so forth.

The memory 404 may include a tangible, computer-readable storage medium that provides storage functionality to store various data and/or program code associated with operation of the wheel sensor module controller 400 and/or the processor 402, such as software programs and/or code segments, or other data to instruct the processor 402, and possibly other components of the wheel sensor module controller 400, to perform the functionality described herein. Thus, the memory 404 can store data, such as a program of instructions for operating the wheel sensor module controller 400, including its components (e.g., processor 402, communication interface 406, etc.). It should be noted that while a single memory is described, a wide variety of types and combinations of memory (e.g., tangible, non-transitory memory) can be employed. The memory 404 can be integral with the processor, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 406 may be operatively configured to communicate with components of the wheel sensor module controller 400. For example, the communication interface 406 can be configured to retrieve data from the processor 402 or other devices, transmit data for storage in the memory 404, retrieve data from storage in the memory 404, and so forth. The communication interface 406 can also be communicatively coupled with the processor 402 to facilitate data transfer between components of the wheel sensor module controller 400 and the processor 402. It should be noted that while the communication interface 406 is described as a component of the wheel sensor module controller 400, one or more components of the communication interface 406 can be implemented as external components communicatively coupled to the wheel sensor module controller 400 via a physical and/or wireless connection.

It shall be understood that the operations performed by the wheel sensor module 106 are not necessarily all performed by one wheel sensor module controller 400. In some embodiments, the operations may be performed by one or controllers. For example, one or more operations and/or sub-operations may be performed by a first controller, additional operations and/or sub-operations may be performed by a second controller, and so forth. Furthermore, some of the operations and/or sub-operations may be performed in parallel and not necessarily in the order that they are disclosed herein.

As shown in FIG. 4A, the wheel sensor module 106 may be powered by a battery 408. For example, the wheel sensor module 106 may be powered by Lithium Thionyl Chloride battery 408, which may allow for a 10-year (or longer) operational lifetime. In other embodiments, the wheel sensor module 106 may include a power supply that is connected to a power source of the direct pivot irrigation system 200 (e.g., to the forward/reverse wires, like the tower box module 104, or to another power line).

The wheel sensor module 106 may be configured to sense wheel rotation using an accelerometer 410 (e.g., an internal accelerometer) that detects the change in inclination that occurs as the wheel 206 rotates. For example, the wheel sensor module 106 may include an accelerometer 410 communicatively coupled to the wheel sensor module controller 400, wherein the accelerometer 410 is configured to detect a change in inclination that occurs when a respective wheel 206 of the direct pivot irrigation system 200 is rotating. In embodiments, the wheel sensor module 106 may be configured to detect very low rates of rotation, such as the rate of rotation that occurs on the innermost towers 204 of a center pivot irrigation system 200 (i.e., the towers 204 nearest to the center pivot 202).

The wheel sensor module 106 can also be configured to sense tire pressure via one or more tire pressure sensors 412. For example, the wheel sensor module controller 400 may be communicatively coupled to a tire pressure sensor 412 (e.g., a transducer assembly) mounted to a valve stem of a tire of the respective wheel 206 that the wheel sensor module 106 is coupled to. In embodiments, tire pressure sensor 412 may include a small transducer assembly that is mounted to the valve stem of the tire and connected to the wheel sensor module 106 (i.e., to the wheel sensor module controller 400) via a short length of cable.

In embodiments, the wheel sensor module 106 may include a low power wireless data link 414 (e.g., a 315 MHz transceiver, or the like) with a respective antenna 416 for sending communications from the wheel sensor module 106 to a respective tower box module 104 (e.g., a tower box module 104 located at the same tower as the wheel sensor module 106). In some embodiments, the low power wireless data link 414 is a 315 MHz unidirectional RF link configured to only send communications from the wheel sensor module 106 to the tower box module 104. This may allow for reduced power consumption. Alternatively, the low power wireless data link 414 may be a bidirectional RF link for sending and receiving communications.

In embodiments, the wheel sensor module controller 400 is configured to transmit detected wheel status data (e.g., detected wheel rotation and/or tire pressure data) to the tower box module 104. The wheel sensor module 106 may be configured to send the wheel status data to the tower box module 104 periodically and/or according to a power saving algorithm. For example, in some embodiments, the wheel sensor module controller 400 is configured to operate in a "sleep mode" when a detected wheel rotation rate is below a threshold wheel rotation rate. In the sleep mode, the wheel sensor module controller 400 may cease reporting of wheel status data to the tower box module 104 or communicate the wheel status data at a lower/less frequent reporting rate. In an "operational mode" (i.e., when the detected wheel rotation rate is above the threshold wheel rotation rate), the wheel sensor module controller 400 may be configured to periodically transmit the wheel status data (e.g., detected wheel rotation and tire pressure data) to the tower box module 104. In this manner, the wheel sensor module 106 may operate in an extremely low power sleep mode when there is no tire rotation and can power up periodically when rotation is sensed to transmit rotation and tire pressure data to the tower box module 104. In other embodiments, the wheel sensor module 106 may be configured to periodically transmit the wheel status data (e.g., detected wheel rotation and tire pressure data) to the tower box module 104 at the same reporting rate regardless of the detected wheel rotation rate.

The wheel sensor module controller 400 may also incorporate software that senses extremely frequent or continuous wheel rotation such as that occurring on the outermost towers 204 of the direct pivot irrigation system 200. However, in such embodiments, the software may limit the number of transmit cycles to prolong battery life. In this regard, the wheel sensor module controller 400 may be configured to detect wheel rotation rate at a much higher frequency detection rate (e.g., 5×, 10×, 20×, or more) than the transmission rate for communicating the wheel status data to the tower box module 104.

Figure 5A:
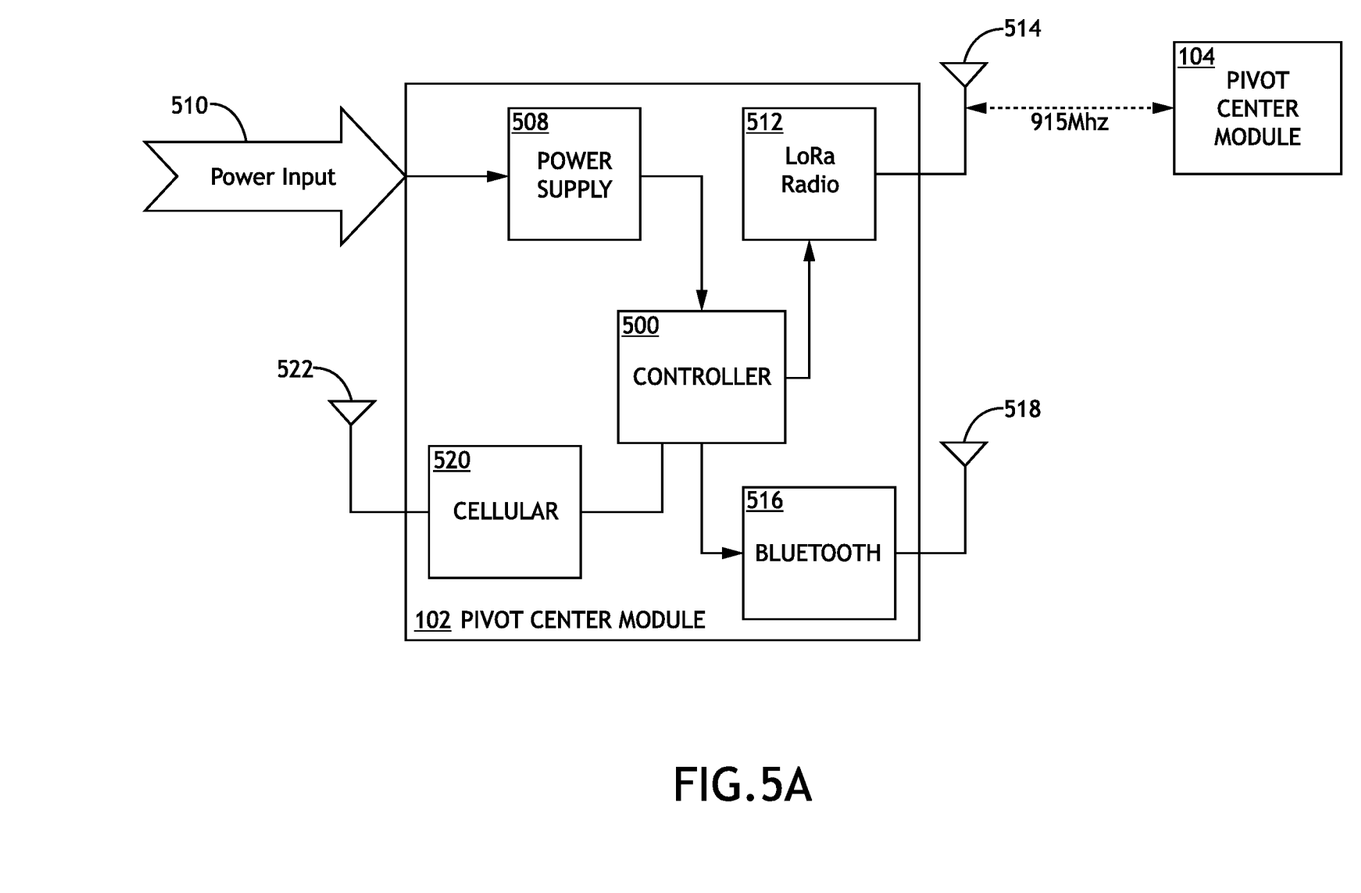
FIG. 5A is a block diagram illustrating a pivot center module of the direct pivot smart tower box communication system, in accordance with an example embodiment of this disclosure.
Figure 5B:
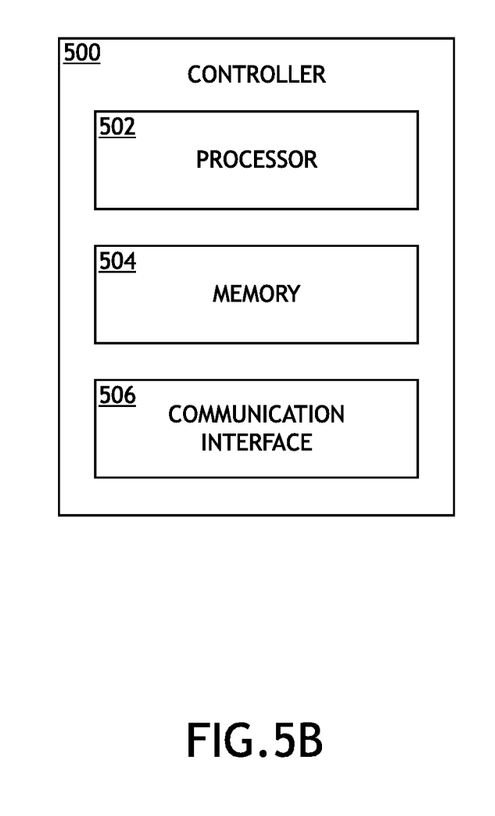
FIG. 5B is a block diagram illustrating a controller of the pivot center module of the direct pivot smart tower box communication system, in accordance with an example embodiment of this disclosure.

FIGS. 5A and 5B are block diagrams illustrating the pivot center module 102 of the direct pivot smart tower box communication system 100, in accordance with one or more example embodiments of this disclosure. The pivot center module 102 may be mounted to the pivot center 202 of the direct pivot irrigation system 200. In embodiments, the pivot center 202 is the central tower of the direct pivot irrigation system 200 about which the other towers 204 travel in a circular path.

The pivot center module 102 may include a pivot center module controller 500 configured to communicate with the tower box modules 104 to collect tower status data and/or send commands for controlling various sensors/actuators that are communicatively coupled to the tower box modules 104. In embodiments, the pivot center module controller 500 may also be configured to communicate with a remote server, local server, cloud storage, mobile device 108, or the like. As shown in FIG. 5B, the pivot center module controller 500 may include, but is not limited to, at least one processor 502, memory 504, and communication interface 506.

The processor 502 provides processing functionality for at least the pivot center module controller 500 and can include any number of microprocessors, microcontrollers, circuitry, field programmable gate array (FPGA) or other processing systems, and resident or external memory for storing data, executable code, and other information accessed or generated by the pivot center module controller 500. The processor 502 can execute one or more software programs embodied in a non-transitory computer readable medium (e.g., memory 504) that implement techniques/operations described herein. The processor 502 is not limited by the materials from which it is formed or the processing mechanisms employed therein and, as such, can be implemented via semiconductor(s) and/or transistors (e.g., using electronic integrated circuit (IC) components), and so forth.

The memory 504 may include a tangible, computer-readable storage medium that provides storage functionality to store various data and/or program code associated with operation of the pivot center module controller 500 and/or the processor 502, such as software programs and/or code segments, or other data to instruct the processor 502, and possibly other components of the pivot center module controller 500, to perform the functionality described herein. Thus, the memory 504 can store data, such as a program of instructions for operating the pivot center module controller 500, including its components (e.g., processor 502, communication interface 506, etc.). It should be noted that while a single memory is described, a wide variety of types and combinations of memory (e.g., tangible, non-transitory memory) can be employed. The memory 504 can be integral with the processor, can comprise stand-alone memory, or can be a combination of both. Some examples of the memory can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 506 may be operatively configured to communicate with components of the pivot center module controller 500. For example, the communication interface 506 can be configured to retrieve data from the processor 502 or other devices, transmit data for storage in the memory 504, retrieve data from storage in the memory 504, and so forth. The communication interface 506 can also be communicatively coupled with the processor 502 to facilitate data transfer between components of the pivot center module controller 500 and the processor 502. It should be noted that while the communication interface 506 is described as a component of the pivot center module controller 500, one or more components of the communication interface 506 can be implemented as external components communicatively coupled to the pivot center module controller 500 via a physical and/or wireless connection.

It shall be understood that the operations performed by the pivot center module 102 are not necessarily all performed by one pivot center module controller 500. In some embodiments, the operations may be performed by one or controllers. For example, one or more operations and/or sub-operations may be performed by a first controller, additional operations and/or sub-operations may be performed by a second controller, and so forth. Furthermore, some of the operations and/or sub-operations may be performed in parallel and not necessarily in the order that they are disclosed herein.

As shown in FIG. 5A, the pivot center module 102 may include a power supply 508 configured to receive a power input 510 (e.g., a 120V AC connection) from an external source. For example, the power input 510 may be supplied from a pivot control unit (e.g., the main controller) at the pivot center 202 of the direct pivot irrigation system 200. In embodiments, the power can be maintained when direct pivot irrigation system 200 has tripped from the control unit, barrier, or safety. In this regard, the power input 510 may be configured to remain active during a safety shutdown event. This allows the status of all tower box modules 104 to be gathered by the pivot center module 102 following a safety shutdown event.

Much like the tower box module 104, the pivot center module 102 is also designed to be robust and survivable. For example, in embodiments, the power supply 508 and monitored inputs are hardened against burst electrical fast transient (EFT) and surge events up to 2 kV (or possibly higher in some embodiments). The power supply 508 can also be designed to minimize loading of power line carrier signals, so that the power supply 508 does not interfere with installed GPS systems that use power line carrier communication.

As noted above, wireless communication between the tower box module 104 and the pivot center module 102 may be provided by Semtech LoRa technology. In embodiments, the pivot center module 102 includes a LoRa wireless transceiver 512 (e.g., a 915 MHz bidirectional RF link) communicatively coupled to the pivot center module controller 500 and a respective antenna 514 for transmitting/receiving communications. The pivot center module controller 500 may be configured to receive collected tower status data from the tower box modules 104, via the LoRa wireless transceiver 512. In embodiments, the system 100 may employ advanced wireless technology including error detection to guarantee the integrity of received data. Additionally, the communication protocol may be based on a network model.

The tower status data from individual towers 204 may be received and stored for later access by a user. For example, in embodiments, the pivot center module controller 500 is configured to periodically receive tower status data from the plurality of tower control modules 104 and store the tower status data in a memory (e.g., memory 504 or a connected storage device) for on-demand user access. In some embodiments, the pivot center module controller 500 may be configured to transmit the tower status data to a remote/local server or cloud storage so that the data is saved in a database that can be accessed via an internet/intranet connection.

The pivot center module 102 may further include a cellular data link 520 with a respective antenna 522 for internet connectivity and/or cellular communications (e.g., SMS/MMS messaging, or the like). In some embodiments, the cellular data link 520 also allows for connectivity to mobile applications (e.g., iOS apps, ANDROID apps, Windows Mobile apps, or the like), web-hosted applications, and so forth.

Additionally or alternatively, the pivot center module 102 may incorporate Bluetooth communication capability. For example, in embodiments, the pivot center module 102 includes a Bluetooth transceiver 516 with a respective antenna 518 configured to connect with a mobile device 108 (e.g., a smartphone, tablet, notebook, smartwatch, or the like) for user access to the stored tower status data. In this regard, monitored data, such as the tower status data, can be accessed any time a user is within range of the pivot center 202 by using the user's mobile device 108 (e.g., via a smartphone or tablet application that employs Bluetooth connectivity). In some embodiments, the pivot center module controller 500 can also be setup for a specific direct pivot irrigation system 200 with a smartphone or tablet application (e.g., via the Bluetooth connection).

In some embodiments, the pivot center module 102 may have the same or similar architecture to the tower box modules 104. In this regard, the pivot center module 102 may include any of the components/circuitry discussed herein with regard to embodiments of the tower box modules 104, or vice versa. In addition, the pivot center module 102 may be designated as a "master" device and the tower box modules 104 may be designated as "slave" devices in a hierarchical network topology. Alternatively, the modules may be configured as a distributed control system, with any of the modules being capable of requesting information from any of the other devices. In such embodiments, the pivot center module 102 and the tower box modules 104 may simultaneously function as "master" and "slave" devices.

Although the technology has been described with reference to the embodiments illustrated in the attached drawing figures, equivalents may be employed and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A direct pivot smart tower box communication system, comprising:
   a plurality of wheel sensor modules coupled to respective wheel hubs of respective towers of a direct pivot irrigation system;
   a plurality of tower box modules coupled to the respective towers of the direct pivot irrigation system, wherein a tower box module of the plurality of tower box modules includes a tower box module controller and is in communication with a wheel sensor module of the plurality of wheel sensor modules, wherein the wheel sensor module is at a same tower as the tower box module; and
   a pivot center module coupled to a pivot center of the direct pivot irrigation system, wherein the pivot center module includes a pivot center module controller and is in communication with the plurality of tower box modules.

2. The direct pivot smart tower box communication system of claim 1, wherein the wheel sensor module is powered by a Lithium Thionyl Chloride battery.

3. The direct pivot smart tower box communication system of claim 1, wherein the wheel sensor module includes a wheel sensor module controller and an accelerometer communicatively coupled to the wheel sensor module controller, wherein the accelerometer is configured to detect a change in inclination that occurs when a respective wheel of the direct pivot irrigation system is rotating.

4. The direct pivot smart tower box communication system of claim 3, wherein the wheel sensor module controller is also communicatively coupled to a tire pressure sensor mounted to a valve stem of a tire of the respective wheel and configured to detect tire pressure of the tire of the respective wheel.

5. The direct pivot smart tower box communication system of claim 4, wherein the wheel sensor module further includes a low power wireless data link configured to transmit detected wheel rotation and tire pressure data to the tower box module.

6. The direct pivot smart tower box communication system of claim 5, wherein the wheel sensor module controller is configured to operate in a sleep mode when a detected wheel rotation rate is below a threshold wheel rotation rate, and the wheel sensor module controller is configured to periodically transmit the detected wheel rotation and tire pressure data when the detected wheel rotation rate is above the threshold wheel rotation rate.

7. The direct pivot smart tower box communication system of claim 1, wherein the tower box module is powered by a 120V AC connection via forward and reverse wires in a span cable of the direct pivot irrigation system.

8. The direct pivot smart tower box communication system of claim 1, wherein the tower box module is hardened against burst electrical fast transient (EFT) and surge events up to at least 2 kV.

9. The direct pivot smart tower box communication system of claim 1, wherein the tower box module is configured to remain operational long enough to report tower status data to the pivot center module after a safety shutdown event.

10. The direct pivot smart tower box communication system of claim 9, wherein the tower box module includes a supercapacitor configured to power the tower box module controller after a safety shutdown event.

11. The direct pivot smart tower box communication system of claim 1, wherein the tower box module controller is configured to collect tower status data including one or more of: safety wire activation, percent wire activation, alignment microswitch status, safety microswitch status, motor contactor coil current, motor contactor 480V phase A switched voltage, motor contactor 480V phase B switched voltage, motor contactor 480V phase C switched voltage, tower movement, wheel rotation rate, tire pressure, end gun boost pump relay coil current, end gun solenoid valve coil current, and end gun discharge water pressure.

12. The direct pivot smart tower box communication system of claim 1, wherein the tower box module includes a long range (LoRa) wireless transceiver configured to transmit collected tower status data to the pivot center module.

13. The direct pivot smart tower box communication system of claim 12, wherein the tower box module controller is configured to periodically transmit the collected tower status data to the pivot center module via the LoRa wireless transceiver and is further configured to receive a responsive acknowledgement from the pivot center module after the collected tower status data is successfully transmitted.

14. The direct pivot smart tower box communication system of claim 1, wherein the tower box module is assigned a unique identifier configured to be scanned via a mobile device when the tower box module is installed to setup a communication network including the plurality of tower box modules and the pivot center module.

15. The direct pivot smart tower box communication system of claim 1, wherein the pivot center module is powered by a 120V AC connection from a pivot control unit of the direct pivot irrigation system.

16. The direct pivot smart tower box communication system of claim 1, wherein the pivot center module is hardened against burst electrical fast transient (EFT) and surge events up to at least 2 kV.

17. The direct pivot smart tower box communication system of claim 1, wherein the pivot center module is configured to remain operational and receive tower status data from the plurality of tower control modules after a safety shutdown event.

18. The direct pivot smart tower box communication system of claim 1, wherein the pivot center module includes a long range (LoRa) wireless transceiver configured to receive tower status data from the plurality of tower control modules.

19. The direct pivot smart tower box communication system of claim 18, wherein the pivot center module controller is configured to periodically receive the tower status data from the plurality of tower control modules and store the tower status data in a memory for on-demand user access.

20. The direct pivot smart tower box communication system of claim 19, wherein the pivot center module includes a Bluetooth transceiver configured to connect with a mobile device for user access to the stored tower status data.

* * * * *